(12) United States Patent
Voelzke et al.

(10) Patent No.: US 11,597,018 B2
(45) Date of Patent: Mar. 7, 2023

(54) SYSTEM AND METHOD FOR CONNECTING A COMPRESSION-TYPE COUPLING TO A COATED CONDUIT

(71) Applicant: Robroy Industries—Texas, LLC, Gilmer, TX (US)

(72) Inventors: Steven A. Voelzke, Longview, TX (US); Terry Henry, Greenville, TX (US); Amanda Lynn Kessel, League City, TX (US)

(73) Assignee: Robroy Industries—Texas, LLC, Gilmer, TX (US)

( * ) Notice: Subject to any disclaimer, the term of this patent is extended or adjusted under 35 U.S.C. 154(b) by 93 days.

(21) Appl. No.: 17/095,049

(22) Filed: Nov. 11, 2020

(65) Prior Publication Data

US 2021/0060663 A1 Mar. 4, 2021

Related U.S. Application Data

(63) Continuation of application No. 16/180,445, filed on Nov. 5, 2018, now abandoned.

(Continued)

(51) Int. Cl.
*B23B 51/04* (2006.01)
*F16L 19/065* (2006.01)
(Continued)

(52) U.S. Cl.
CPC .......... *B23B 51/04* (2013.01); *B23B 51/0054* (2013.01); *F16L 19/065* (2013.01);
(Continued)

(58) Field of Classification Search
CPC . B23B 51/04; B23B 51/0054; B23B 2215/72; F16L 19/065; H02G 3/0481;
(Continued)

(56) References Cited

U.S. PATENT DOCUMENTS 2,641,944 A * 6/1953 Laffoon ................... B25D 3/00
 82/131
3,075,219 A * 1/1963 Ott .......................... B23B 5/168
 144/205

(Continued)

FOREIGN PATENT DOCUMENTS

DE 10133183 C1 * 11/2002 ............ F16L 13/146
JP H01265413 A * 10/1989

*Primary Examiner* — Boyer D Ashley
*Assistant Examiner* — Reinaldo A Vargas Del Rio
(74) *Attorney, Agent, or Firm* — The Webb Law Firm (57) ABSTRACT

A tool for removing a coating from an end of a coated conduit comprising a metallic conduit having an outer diameter and a polymeric material applied over the outer diameter thereof is provided. The tool comprises: a guide member having an outer diameter sized to fit within an internal diameter of the metallic conduit; and a cylindrical cutting member having a substantially closed first end rotatably connected to an arbor, a substantially open second end, and a plurality of teeth elements. The cylindrical cutting member has an inner diameter that is substantially equal to the outer diameter of the metallic conduit such that when the cylindrical cutting member is rotated, the teeth elements remove the polymeric material from the outer diameter of the metallic conduit.

16 Claims, 13 Drawing Sheets

Related U.S. Application Data (60) Provisional application No. 62/583,761, filed on Nov. 9, 2017.

(51) Int. Cl.
*B23B 51/00* (2006.01)
*H02G 1/12* (2006.01)
*H02G 3/04* (2006.01)
*H02G 3/06* (2006.01)

(52) U.S. Cl.
CPC ........ *B23B 2215/72* (2013.01); *H02G 1/1224* (2013.01); *H02G 1/1246* (2013.01); *H02G 3/0481* (2013.01); *H02G 3/06* (2013.01); *Y10T 29/49947* (2015.01); *Y10T 29/49995* (2015.01)

(58) Field of Classification Search
CPC ................ H02G 3/06; Y10T 29/44947; Y10T 29/49995; Y10T 29/49947
See application file for complete search history.

(56) References Cited

U.S. PATENT DOCUMENTS

| | | | |
|---|---|---|---|
| 3,495,484 A * | 2/1970 | Bunnell | H02G 1/1226 30/90.1 |
| 3,799,584 A * | 3/1974 | Slocum | F16L 19/065 411/432 |
| 4,691,600 A | 9/1987 | Carlson et al. | |
| 6,929,430 B2 | 8/2005 | Dever | |
| 7,093,360 B1 | 8/2006 | Craig | |
| 7,140,816 B2 | 11/2006 | Hall | |
| 8,100,037 B2 | 1/2012 | Hall | |
| 8,586,881 B1 | 11/2013 | Shemtov | |
| 8,827,603 B2 | 9/2014 | Eck | |
| 2019/0091776 A1 | 3/2019 | Shafer | |

\* cited by examiner

SYSTEM AND METHOD FOR CONNECTING A COMPRESSION-TYPE COUPLING TO A COATED CONDUIT

CROSS REFERENCE TO RELATED APPLICATIONS

This application is a continuation of U.S. patent application Ser. No. 16/180,445 filed Nov. 5, 2018, which claims priority to U.S. Provisional Patent Application Ser. No. 62/583,761, entitled "System and Method for Connecting a Compression-Type Coupling to a Coated Conduit", filed Nov. 9, 2017, the contents of each of which are incorporated herein by reference.

BACKGROUND OF THE INVENTION

Field of the Invention

The present disclosure generally relates to a system and method for connecting a compression-type coupling to a coated conduit and, more particularly, to a tool for removing the coating from the ends of a coated conduit and specifically to an unthreaded end of the coated conduit.

Description of Related Art

Conduit is a well-known protective covering and routing path for use with electrical wire and cable in both commercial and industrial applications. Electrical installments utilizing conduit typically include lengths of conduit connected by various types of fittings. Conduit is offered in a variety of metal, plastic, and composite materials, and is selected based on the needs of a particular application. Additionally, polyvinyl chloride (PVC)-coated conduits are often provided to maximize the life of the electrical wire and cable contained within and to prevent corrosion from sabotaging the structural integrity. This is achieved through PVC coating adhered to the external surface of the system, preventing exposure to external environmental conditions that could result in corrosion of the steel or aluminum system underneath and an internal urethane coating that prevents corrosion from atmospheric conditions that could compromise the system from within.

Various types of couplings are used to connect different types of conduit. Compression-type couplings have grown more popular because such couplings can quickly connect two pieces of conduit, can accommodate both threaded and unthreaded conduits, and provide resistance to contaminants such as dust or moisture. An example of such a compression-type coupling is disclosed in U.S. Pat. No. 8,586,881, which is incorporated herein by reference.

However, such compression-type couplings cannot be used on conduits that have been externally coated. Accordingly, the coating must be removed from the area on the ends of the conduit to which the compression-type coupling is applied, particularly the unthreaded ends of the coated conduit. This is a vary labor intensive undertaking and delays the assembly of a conduit system. Accordingly, a need exists for a tool to quickly and easily remove the coating from the ends of coated conduits.

SUMMARY OF THE INVENTION

A tool to quickly and easily remove the coating from the ends of coated conduits is described in detail herein. This tool allows the coating to be removed from the ends of the conduit when in the field, thereby allowing the coated conduit to be connected to a compression-type coupling.

More specifically, in one example, a tool for removing a coating from an end of a coated conduit comprising a metallic conduit having an outer diameter and a polymeric material applied over the outer diameter thereof is provided. The tool comprises: a guide member having an outer diameter sized to fit within an internal diameter of the metallic conduit; and a cylindrical cutting member having a substantially closed first end rotatably connected to an arbor and a substantially open second end comprising a plurality of teeth elements. The cylindrical cutting member has an inner diameter that is substantially equal to the outer diameter of the metallic conduit such that when the cylindrical cutting member is rotated, the teeth elements remove the polymeric material from the outer diameter of the metallic conduit.

The arbor may be configured to be operatively connected to a drill or other rotary-type tool to rotate the cylindrical cutting member. The guide member may be positioned within the coated conduit coaxially with the cylindrical cutting member such that the cylindrical cutting member surrounds the guide member. The guide member may be operatively connected to the first end of the cylindrical cutting member such that the guide member rotates with the cylindrical cutting member. Alternatively, the guide member is inserted into the coated conduit and includes a guide hole on an upper surface thereof to guide the cylindrical cutting member.

In some examples, the plurality of teeth elements may at least one of extend from the open second end of the cylindrical cutting member or extend from an inner diameter of the open second end of the cylindrical cutting member. In addition, the plurality of teeth elements may be adjustable to accommodate coated conduits having different sized outer diameters.

Also provided is a method of connecting a coated conduit to a compression-type coupling. The method comprises: providing a coated conduit comprising a metallic conduit having an outer diameter and a polymeric material applied over the outer diameter of the metallic conduit; providing a tool comprising: a guide member having an outer diameter sized to fit within an internal diameter of the metallic conduit; and a cylindrical cutting member comprising: a substantially closed first end rotatably connected to an arbor; a substantially open second end comprising a plurality of teeth elements; and an inner diameter that is substantially equal to the outer diameter of the metallic conduit; rotating the cylindrical cutting member such that the teeth elements remove the polymeric material from the outer diameter of an end of the metallic conduit; and; connecting the compression-type coupling to the end of the metallic conduit where the polymeric material has been removed.

In addition, provided is a tool for removing a coating from an end of a coated conduit comprising a metallic conduit having an outer diameter and a polymeric material applied over the outer diameter of the metallic conduit. The tool comprises: a guide member having an outer diameter sized to fit within an internal diameter of the metallic conduit; and a cylindrical cutting member having a substantially closed first end rotatably connected to an arbor, a substantially open second end, and a plurality of teeth elements. The cylindrical cutting member is configured to surround the coated conduit such that when the cylindrical cutting member is rotated, the teeth elements remove the polymeric material from the outer diameter of the metallic conduit.

In some examples, the plurality of teeth elements may extend from the second end of the cylindrical cutting member. Alternatively, the plurality of teeth elements may extend from an inner diameter of the cylindrical cutting member. In addition, the plurality of teeth elements may be adjustable to accommodate coated conduits having different sized outer diameters.

The arbor may be operatively connected to a drill to rotate the cylindrical cutting member. In some examples, the guide member may be positioned within the coated conduit coaxially with the cylindrical cutting member such that the cylindrical cutting member surrounds the guide member. Alternatively, the guide member may be operatively connected to the first end of the cylindrical cutting member such that the guide member rotates with the cylindrical cutting member. The guide member may be inserted into the coated conduit and includes a guide hole on an upper surface thereof to guide the cylindrical cutting member.

These and other features and characteristics of the device of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the device of the present disclosure. As used in the specification and the claims, the singular form of "a", "an", and "the" include plural referents unless the context clearly dictates otherwise.

DESCRIPTION OF THE INVENTION

For purposes of the description hereinafter, terms such as "upper", "lower", "right", "left", "vertical", "horizontal", "top", "bottom", "lateral", "longitudinal", and derivatives thereof, shall relate to the device of the present disclosure as it is oriented in the drawing figures. However, it is to be understood that the device of the present disclosure may assume various alternative variations, except where expressly specified to the contrary. It is also to be understood that the specific devices illustrated in the attached drawings, and described in the following specification, are simply exemplary embodiments of the device of the present disclosure. Hence, specific dimensions and other physical characteristics related to the embodiments disclosed herein are not to be considered as limiting.

Compression-type couplings have grown in popularity due to the fast and efficient nature in which these types of couplings allow two pieces of conduit to be connected. One example of a compression-type coupling is disclosed in U.S. Pat. No. 8,586,881. The compression-type coupling disclosed therein includes an outer surface opposing an inner surface, with teeth extending radially inwardly from the inner surface. First and second circumferential ends are complementarily interfittable, and are separated by a circumferential gap, allowing the compression ring to be compressible when being installed in a connector assembly. First and second axial ends of the compression ring are chamfered to facilitate compression. The teeth extend circumferentially from the first and second circumferential ends and are complementary to conduit threading. Each tooth includes first and second sides, with the first side perpendicular to the inner surface to resist pullout of a conduit from the connector assembly. The teeth terminate in sharp points for better gripping of unthreaded conduits. A compressed compression ring accommodates threaded conduits by complementarily mating with threading, and unthreaded conduits by biting into their outer surfaces. While the compression-type coupling disclosed in U.S. Pat. No. 8,586,881 has been described hereinabove as an example of a compression-type coupling, this is not to be construed as limiting the present disclosure as any type of compression-type coupling may be utilized.

However, such compression-type couplings cannot be used to connect a coated conduit without first removing the polymeric coating from the end of the conduit. As described hereinabove, this is a labor intensive and time consuming process. Accordingly, with reference to FIGS. 1, 2A, 2B, and 3A, a tool 1 is provided for quickly and easily removing the coating from the ends of a coated conduit. This tool 1 allows the coating to be removed from the ends of the conduit when in the field, thereby allowing the coated conduit to be connected to a compression-type coupling.

The tool 1 is configured to remove a coating from an end of a coated conduit 3 (see FIGS. 4 and 5) comprising a metallic conduit 5 having an outer diameter 7 (see FIG. 4) and a polymeric material 9, such as, but not limited to, PVC, applied over the outer diameter 7 thereof. The tool 1 comprises a guide member 11 having an outer diameter sized to fit within an internal diameter of the metallic conduit 5; and a cylindrical cutting member 13 having a substantially closed first end 15 rotatably connected to an arbor 17 and a substantially open second end 19 comprising a plurality of teeth elements 21.

Figure 1:
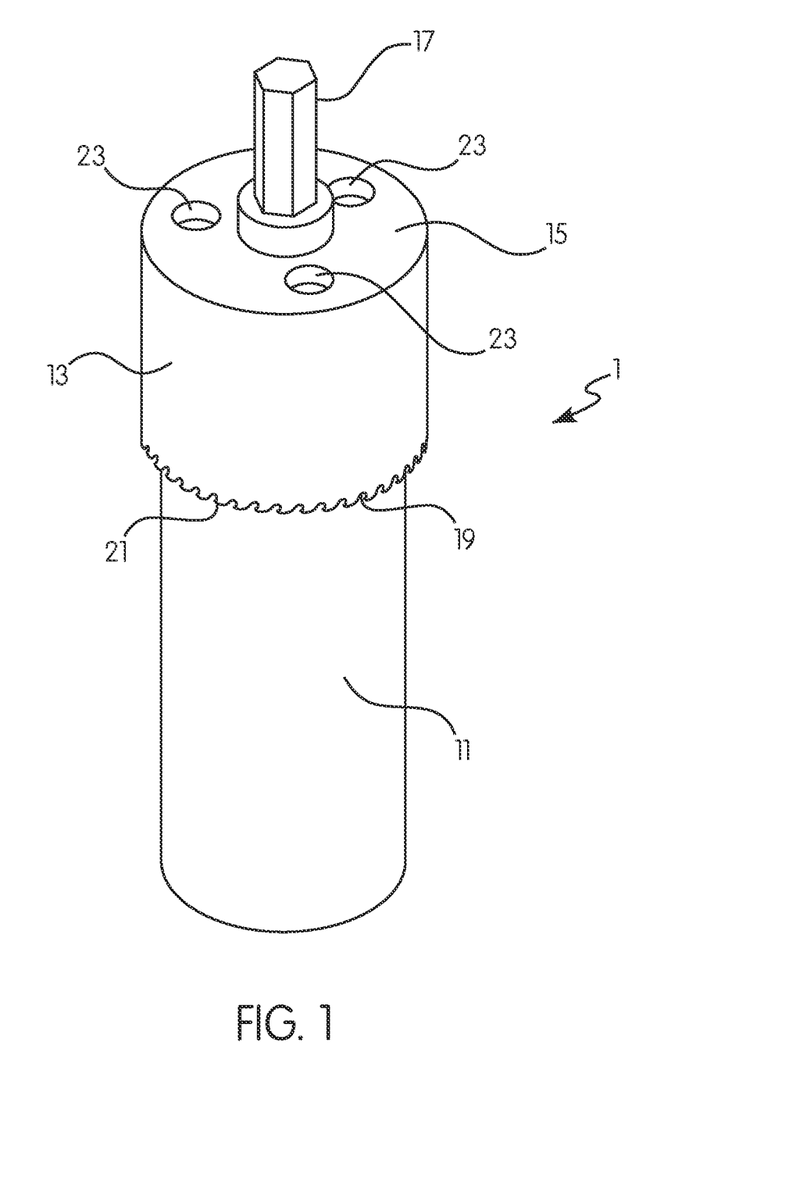
FIG. 1 is a perspective view of an example of a tool for removing a coating from the ends of a coated conduit.
Figure 2A:
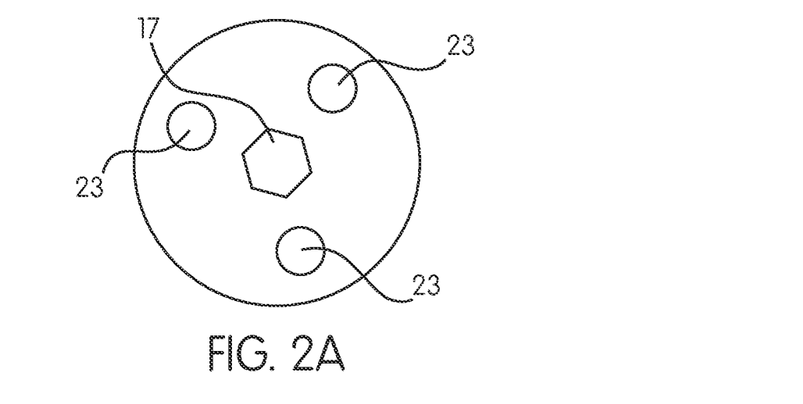
FIG. 2A is a top view of the tool of FIG. 1.
Figure 2B:
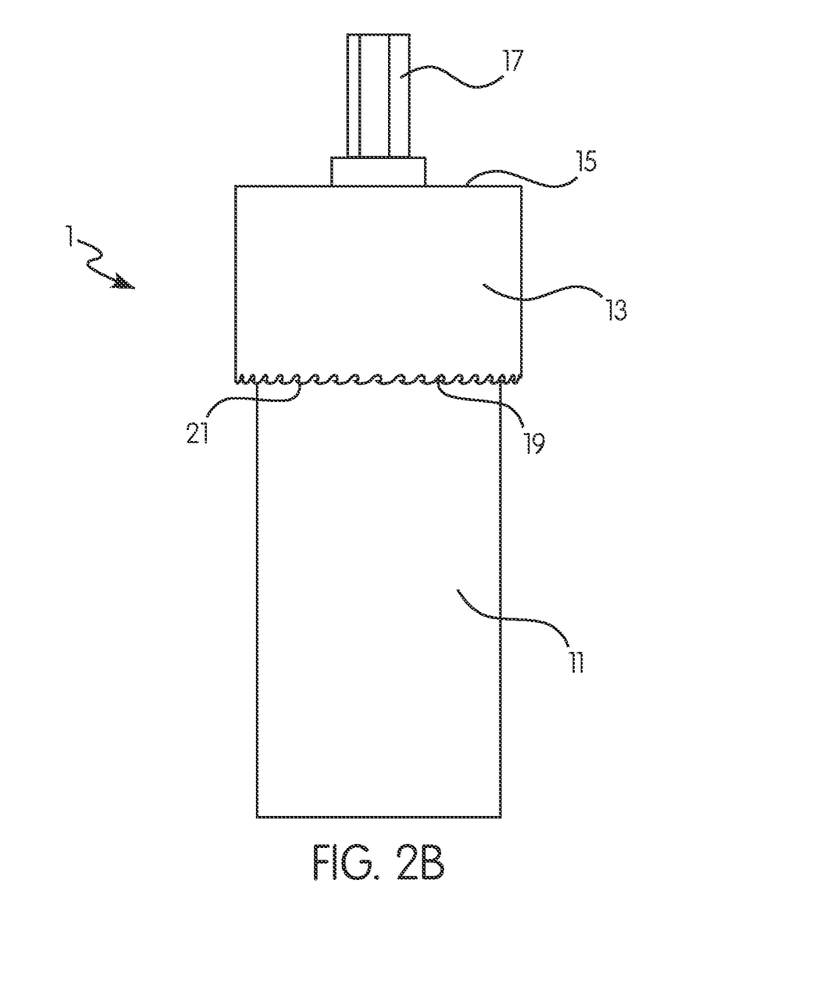
FIG. 2B is a side view of the tool of FIG. 1.

The guide member 11 is operatively connected to the first end 15 of the cylindrical cutting member 13 via bolts 23 or some other suitable fastening mechanism such that the guide member 11 rotates with the cylindrical cutting member 13. The guide member 11 is configured to be manufactured from Teflon™, Onyx manufactured by Markforged, or some other suitable material that will not damage the interior surface of the coated conduit 3.

The cylindrical cutting member 13 has an inner diameter that is substantially equal to the outer diameter 7 of the metallic conduit 5 and is positioned coaxially with regard to the guide member 11. In some examples, the cylindrical cutting member 13 is configured to be sized to surround the coated conduit 3. The teeth elements 21 may be manufactured integrally with the remainder of the cylindrical cutting member 13 or these teeth elements 21 may be configured to be removed from the remainder of the cylindrical cutting member 13 when dull and replaced. In addition, the plurality of teeth may be configured as blades, jagged edges, or any other suitable device capable of removing the coating of the conduit and may be positioned at any suitable angle and position along the length of the cylindrical cutting member.

Figure 3A:
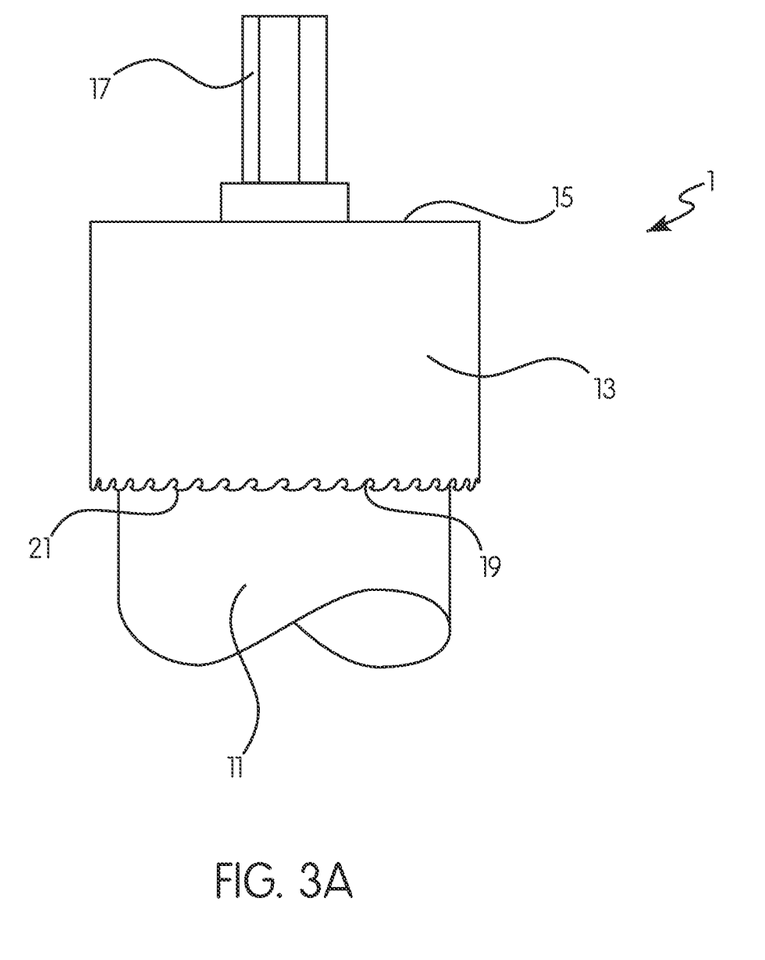
FIG. 3A is an enlarged view of the side view of FIG. 2A.
Figure 3B:
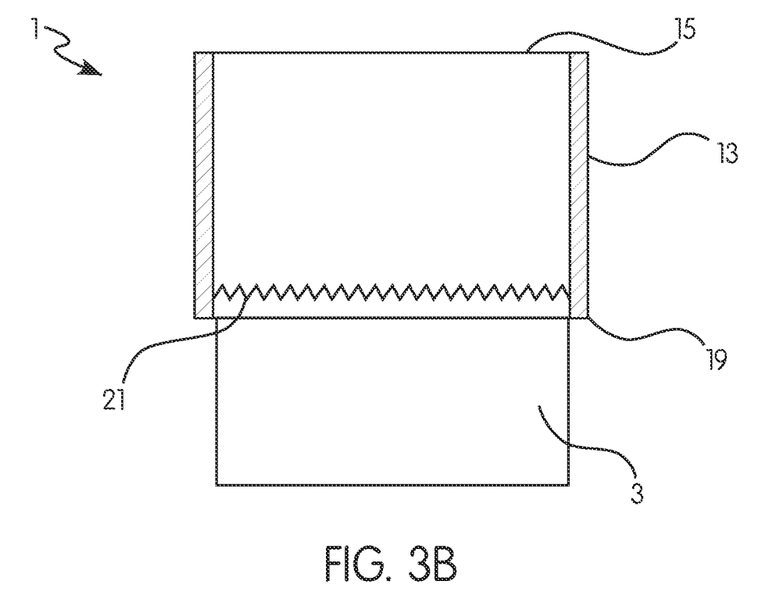
FIG. 3B is a schematic cross-sectional view of another example of a tool for removing a coating from the ends of a coated conduit.
Figure 3C:
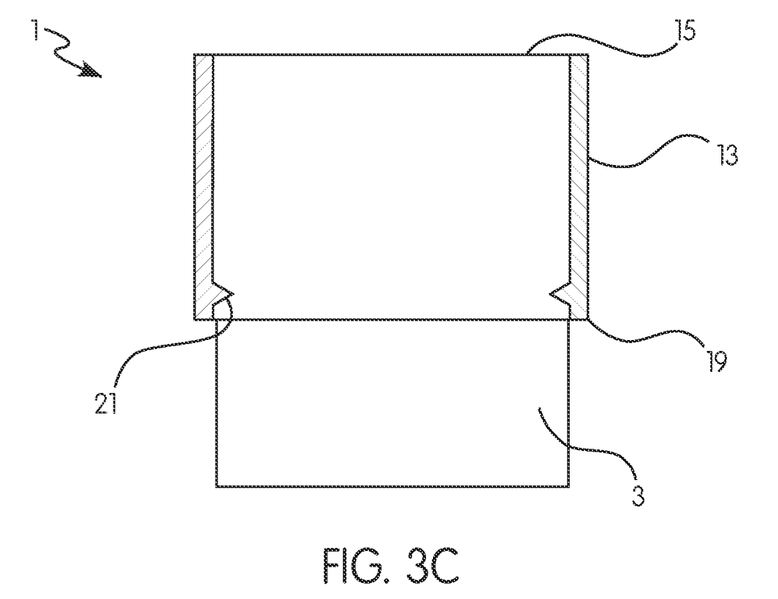
FIG. 3C is a schematic cross-sectional view of yet another example of a tool for removing a coating from the ends of a coated conduit.

As shown in FIG. 3A, the teeth elements 21, in one example, are positioned at the second end 19 of the cylindrical cutting member 13 and extend therefrom. With reference to FIGS. 3B and 3C, the teeth elements 21 may be positioned at other locations within the cylindrical cutting member 13 near the second end thereof. For example, as shown in FIG. 3B, the teeth elements 21 may be formed along the interior circumference of the cylindrical cutting member 13 and may be formed such that they are parallel to the length of the conduit 3. In an alternative example, as shown in FIG. 3C, the teeth elements 21 may be formed along the interior circumference of the cylindrical cutting member 13 and may be formed such that they are perpendicular to the length of the conduit 3. In yet another example (not shown), the teeth elements 21 may be provided along the interior circumference of the cylindrical cutting member 13 at any suitable angle between the angle shown in FIG. 3B and the angle shown in FIG. 3C.

Regardless of where the teeth elements 21 are provided on the cylindrical cutting member 13, the arbor 17 is configured to be attached to a drill (not shown) or any other suitable rotary-type tool to provide rotation to the arbor and to the cylindrical cutting member 13.

In operation, the guide member 11 is positioned within the coated conduit 3 until the teeth elements 21 of the cylindrical cutting member 13 are provided in contact with the polymeric material 9. The drill is then powered on to rotate the cylindrical cutting member 13 and the guide member 11 such that the teeth elements 21 remove the polymeric material 9 from the outer diameter 7 of the metallic conduit 5, thereby providing the coated conduit 3 with an end 25 free from polymeric material (see FIG. 5).

Figure 4:
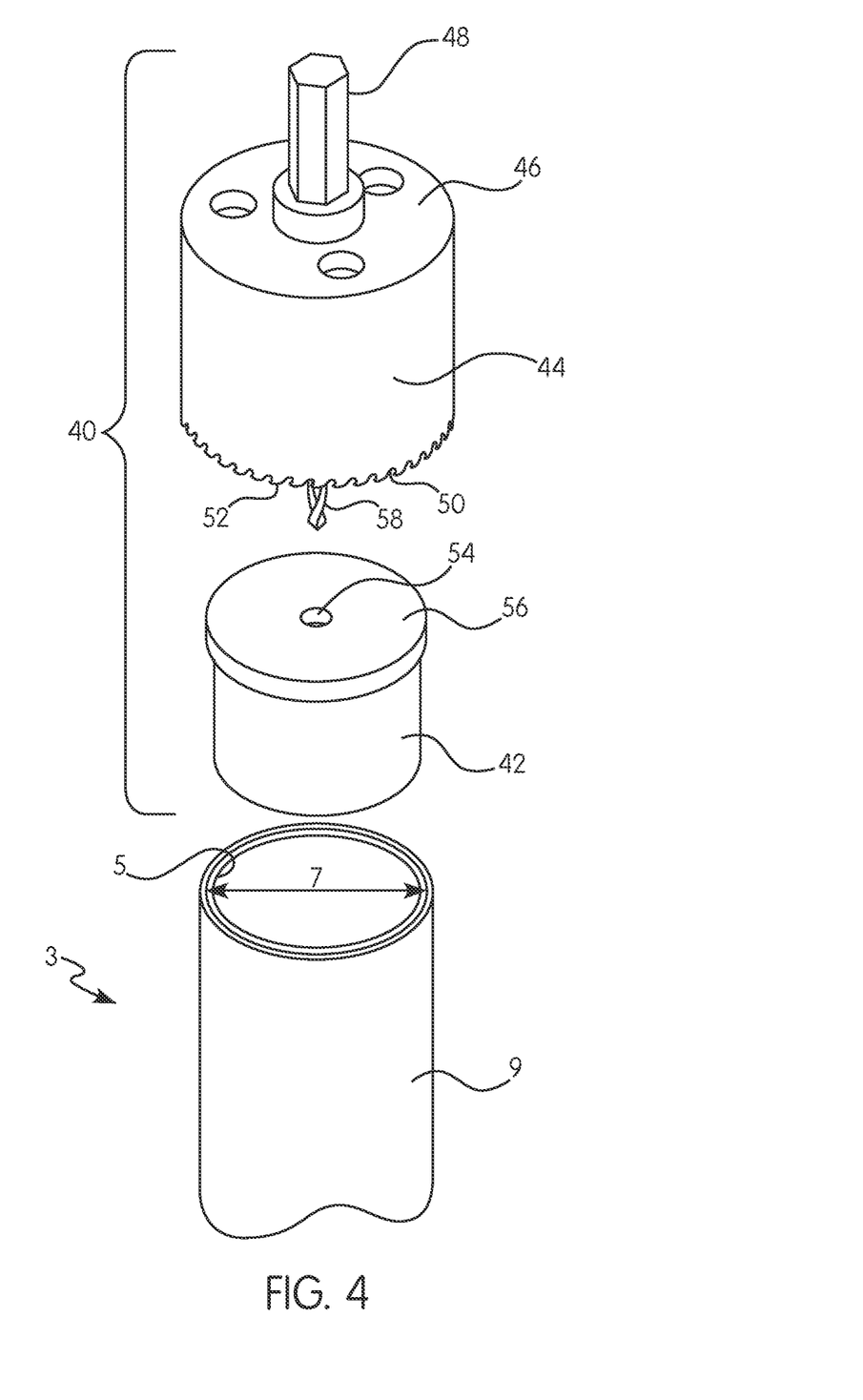
FIG. 4 is a perspective view of an alternative example of a tool for removing a coating from the ends of a coated conduit.
Figure 5:
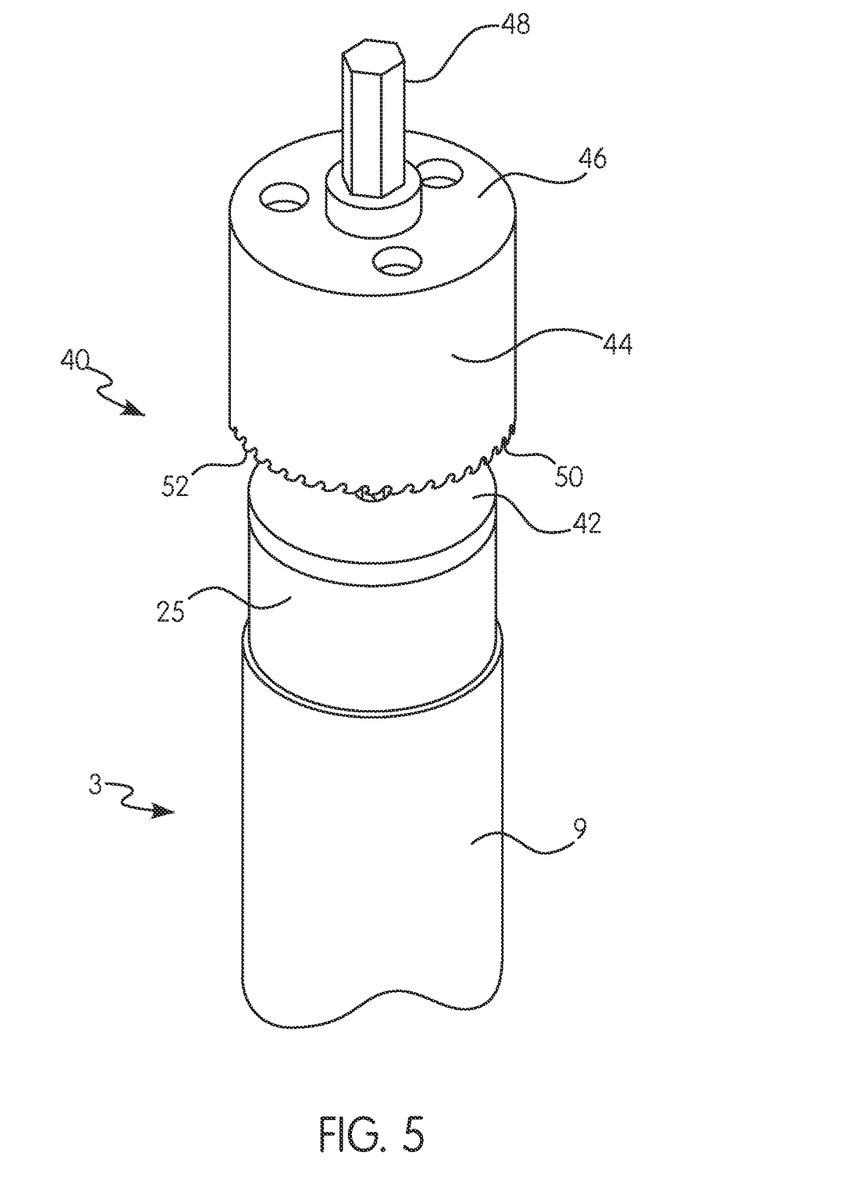
FIG. 5 is a perspective view of the tool of FIG. 4 showing the coated conduit with the coating removed from the end of the coated conduit.

With reference to FIGS. 4 and 5, an alternative version of the tool described hereinabove is provided. This tool 40 is also configured to remove a coating from an end 25 of a coated conduit 3 comprising a metallic conduit 5 having an outer diameter 7 and a polymeric material 9, such as, but not limited to, PVC, applied over the outer diameter 7 thereof. The tool 40 comprises a guide member 42 having an outer diameter sized to fit within an internal diameter of the metallic conduit 5; and a cylindrical cutting member 44 having a substantially closed first end 46 rotatably connected to an arbor 48 and a substantially open second end 50 comprising a plurality of teeth elements 52.

The guide member 42 is configured to be inserted into the coated conduit 3 and includes a guide hole 54 on an upper surface 56 thereof to guide the cylindrical cutting member 44. The guide member 42 is configured to be provided as a separate piece from the cylindrical cutting member 44 and is inserted into the coated conduit 3 prior to engaging the cylindrical cutting member 44.

The cylindrical cutting member 44 has an inner diameter that is substantially equal to the outer diameter 7 of the metallic conduit 5 and is positioned coaxially with regard to the guide member 42 by inserting a drill bit 58, which extends along a longitudinal axis of the cylindrical cutting member 44, into the guide hole 54 of the guide member 42. As with the example described above, the teeth elements 52 may be manufactured integrally with the remainder of the cylindrical cutting member 44 or these teeth elements 52 may be configured to be removed from the remainder of the cylindrical cutting member 44 when dull and replaced.

The arbor 48 is configured to be attached to a drill (not shown) or any other suitable rotary-type tool to provide rotation to the arbor and to the cylindrical cutting member 44.

In operation, the guide member 42 is positioned within the coated conduit 3. Thereafter, the drill bit 58 is inserted into the guide hole 54 of the guide member 42 until the teeth elements 52 of the cylindrical cutting member 44 are provided in contact with the polymeric material 9. The drill is then powered on to rotate the cylindrical cutting member 44 such that the teeth elements 52 remove the polymeric material 9 from the outer diameter 7 of the metallic conduit 5, thereby providing the coated conduit 3 with an end 25 free from polymeric material 9.

Figure 6A:
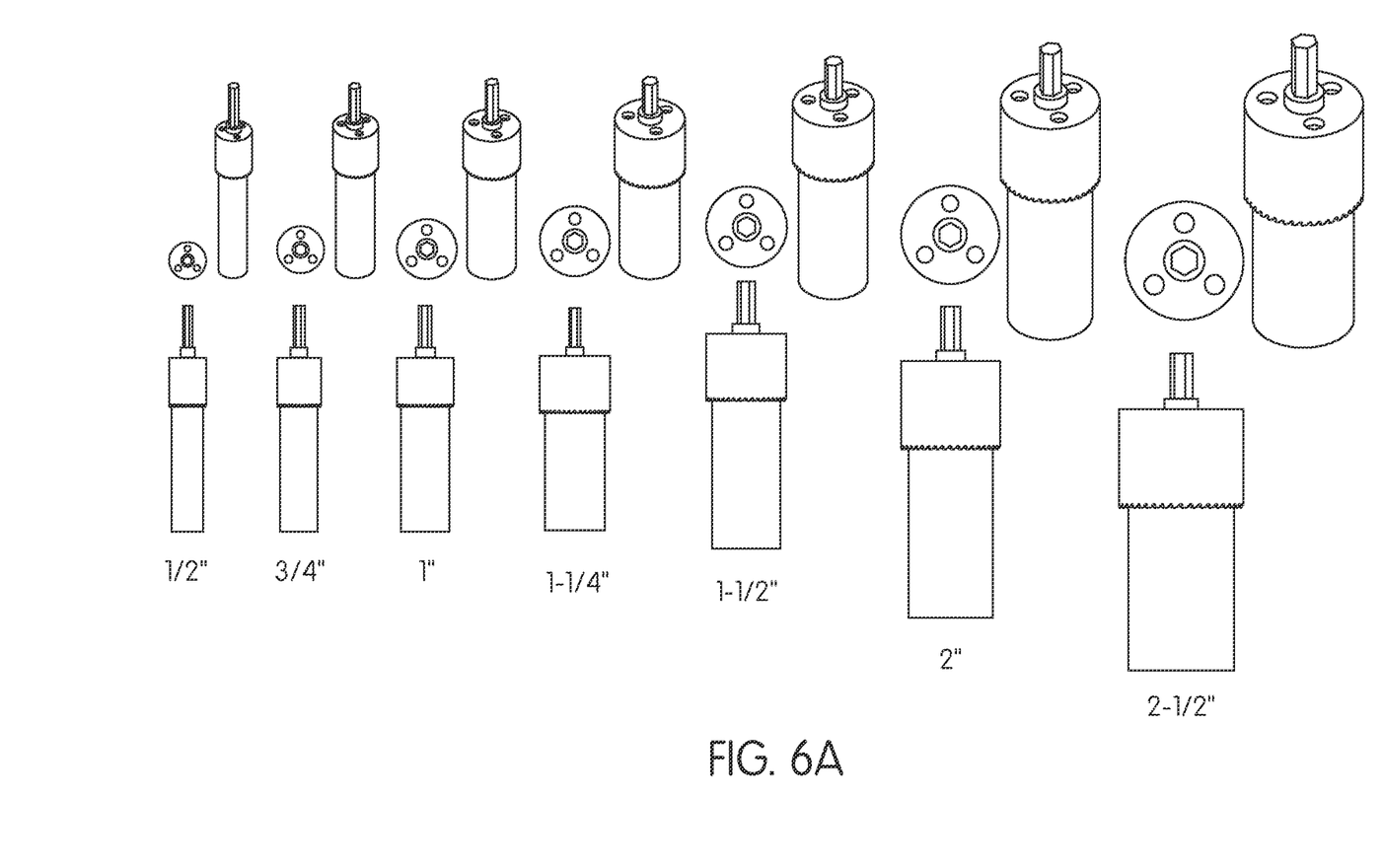
FIG. 6A provides perspective, top, and side views of various sizes of the tool of FIGS. 1, 2A, 2B, and 3A.
Figure 6B:
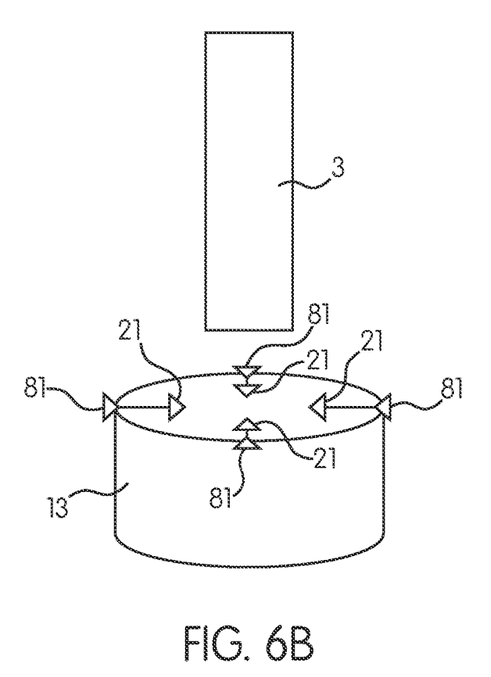
FIGS. 6B and 6C are schematic cross-sectional views of another example of a tool for removing a coating from the ends of a coated conduit.
Figure 6C:
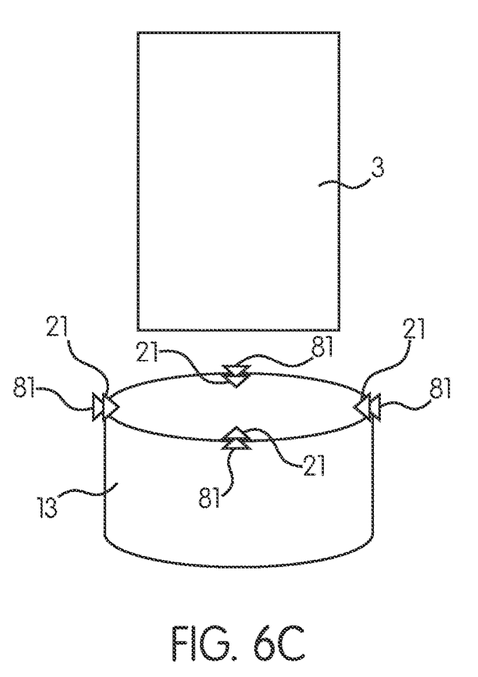

With reference to FIG. 6A, the guide member and the cylindrical cutting member may be provided in a variety of different sizes to accommodate a variety of different sized conduits. For example, the tools may be provided as a kit having various different diameters such as ½ inch, ¾ inch, 1 inch, 1¼ inch, 1½ inch, 2 inch, and 21 inch as shown in FIG. 6A. Various other sizes such as, but not limited to, 3 inch, 3½ inch, 4 inch, 5 inch, and 6 inch may be provided depending on the sizes of the conduits. Alternatively, as shown in FIGS. 6B and 6C, the teeth elements 21 may be adjustable so that each teeth element 21 may be sized to any outside diameter of the coated conduit 3. For example, each of the teeth elements 21 may be positioned on the inner diameter of the cylindrical cutting member 13 and provided on a mechanism 81 for moving the teeth elements closer or further away from the center of the cutting member 13. The mechanism 81 may be, for example, a threaded connection between an end of the teeth elements 21 and the inner diameter of the cylindrical cutting member 13.

Figure 13:
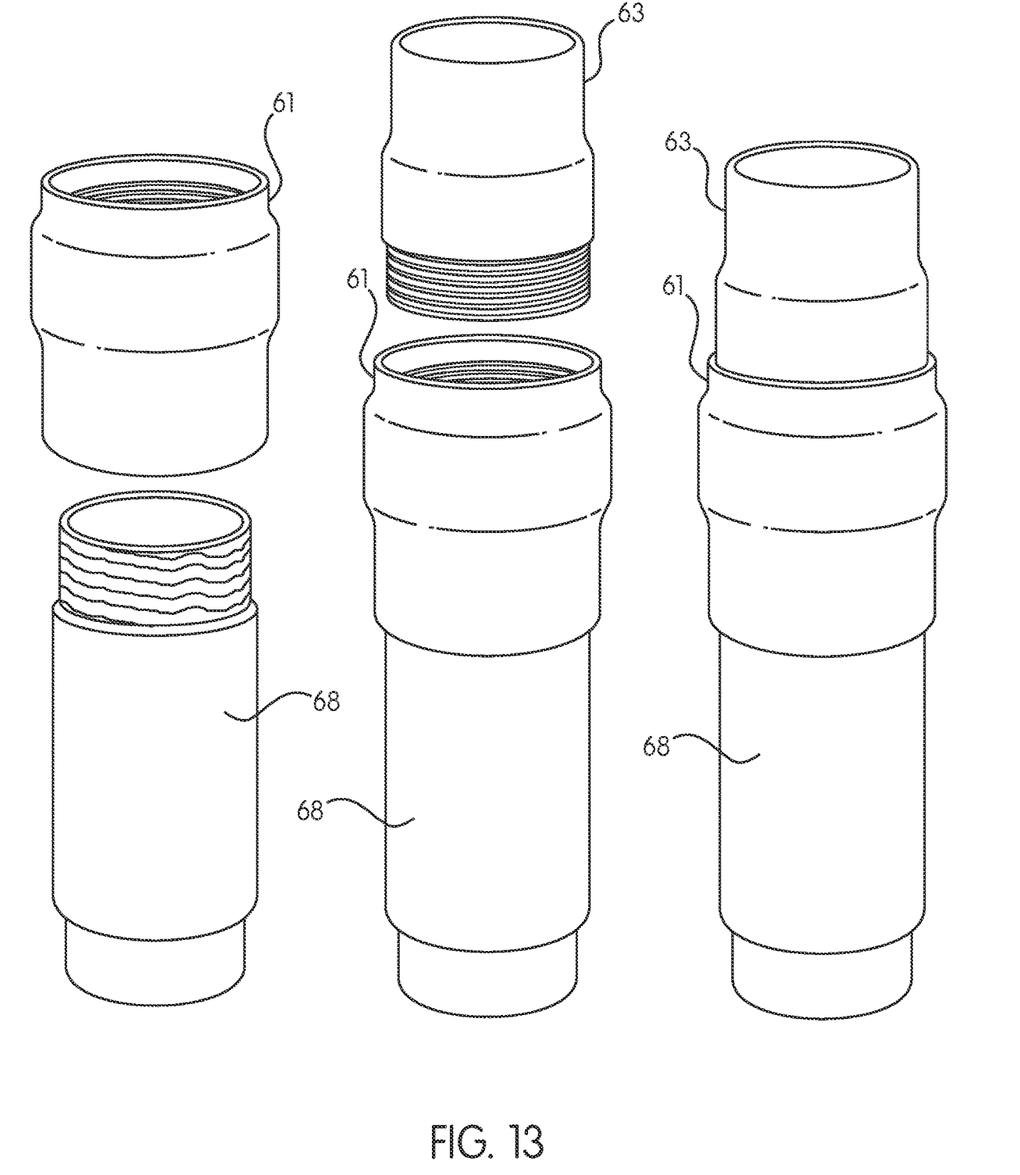
FIG. 13 provides perspective views illustrating the process for connecting a coated conduit to the coated compression-type coupling.

The above described tools 1 and 40 may be used as part of a method for connecting a coated conduit 3 to a compression-type coupling (see FIG. 13). The method comprises: providing a coated conduit 3 comprising a metallic conduit 5 having an outer diameter 7 and a polymeric material 9 applied over the outer diameter 7 of the metallic conduit 5; providing one of tools 1 and 40; rotating the cylindrical cutting member 13, 44 of the tool 1, 40 such that the teeth elements 21, 52 remove the polymeric material 9 from the outer diameter 7 of an end 25 of the metallic conduit 5; and connecting the compression-type coupling to the end 25 of the metallic conduit 5 where the polymeric material 9 has been removed.

Figure 7A:
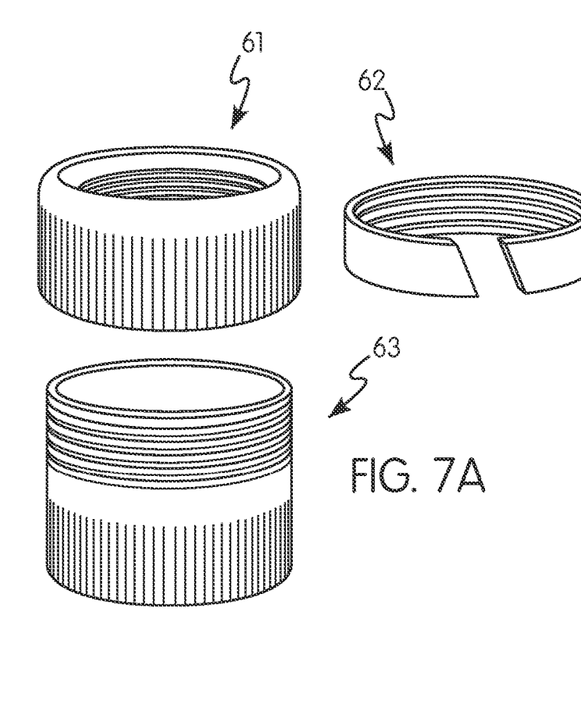
FIG. 7A is a perspective view of the various components of an exemplary compression-type coupling.
Figure 7B:
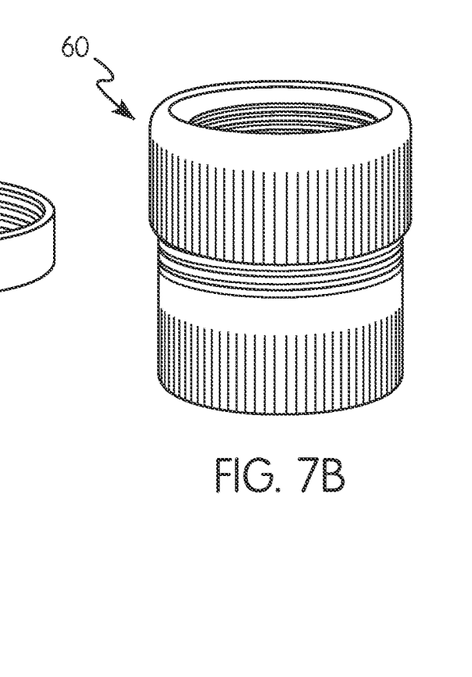
FIG. 7B is a perspective view of the assembled coupling of FIG. 7A.
Figure 8:
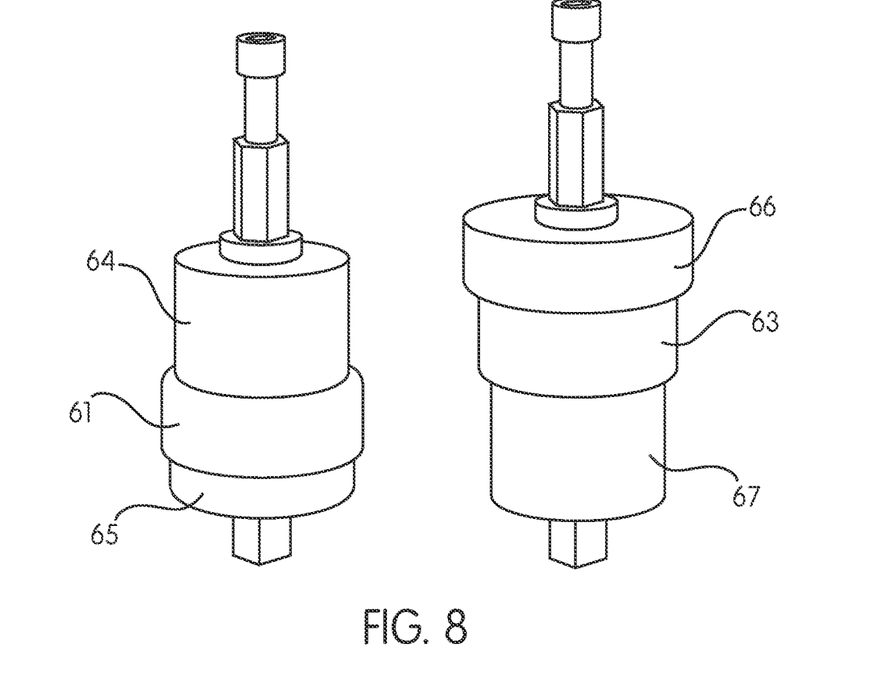
FIG. 8 is a perspective view of tooling used to coat the components of the compression-type coupling of FIG. 7A.

The present disclosure is also directed to a method and tooling used for coating a compression-type coupling such as the exemplary compression-type coupling 60 shown in FIGS. 7A and 7B. The compression-type coupling 60 includes a top piece 61, a bottom piece 63, and a compression ring 62. In order to coat such a coupling, the top piece 61 is positioned on a hanger 64, and plug 65 is positioned within the opening of the top piece 61 as shown in FIG. 8. In addition, the bottom piece 63 is also positioned on a hanger 66, and a plug 67 is positioned within the opening of the bottom piece 63 as shown in FIG. 8. Thereafter, the top piece 61 and the bottom piece 63 are coated with a polymeric material using a conventional coating procedure to produce a coated top piece 61 and a coated bottom piece 63, as shown in FIG. 9, that are assembled to produce a coated coupling as shown in FIG. 10.

Figure 11:
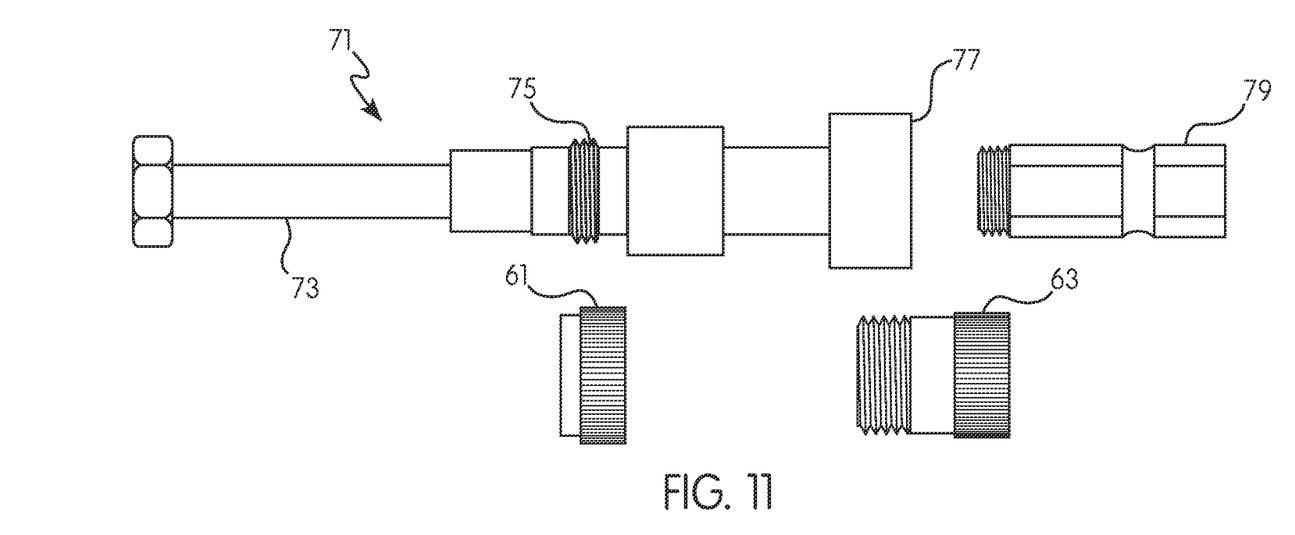
FIGS. 11 and 12 are perspective views of an alternative example of tooling used to coat the components of the compression-type coupling of FIG. 7A.
Figure 12:
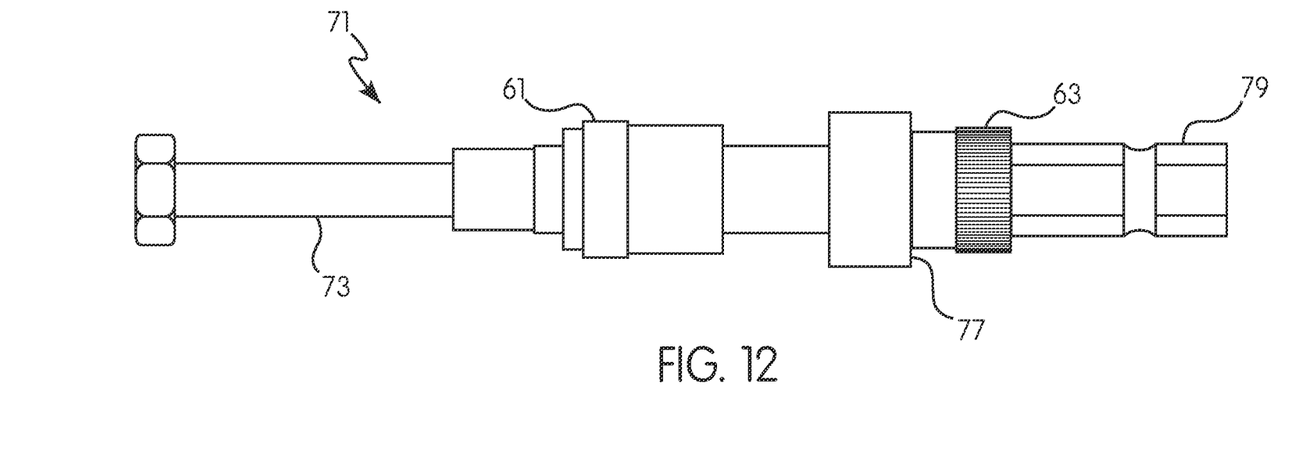

With reference to FIGS. 11 and 12, an alternative tooling 71 for coating the compression-type coupling is shown. This tooling 71 reduces the number of components leading to faster assembly and processing time. More specifically, tooling 71 allows both the top piece 61 and the bottom piece 63 to be coated using a single component. Tooling 71 includes a hanger portion 73 having a male threaded portion 75 configured to receive the female threads of the top piece 61 of the compression-type coupling. The hanger portion 73 further includes a female threaded portion 77 provided at a second end thereof and configured to receive the male threads of the bottom piece 63 of the compression-type coupling. The tooling 71 is further provided with a plug 79 that is positioned within the opening of the bottom piece 63 as shown in FIG. 12.

Figure 9:
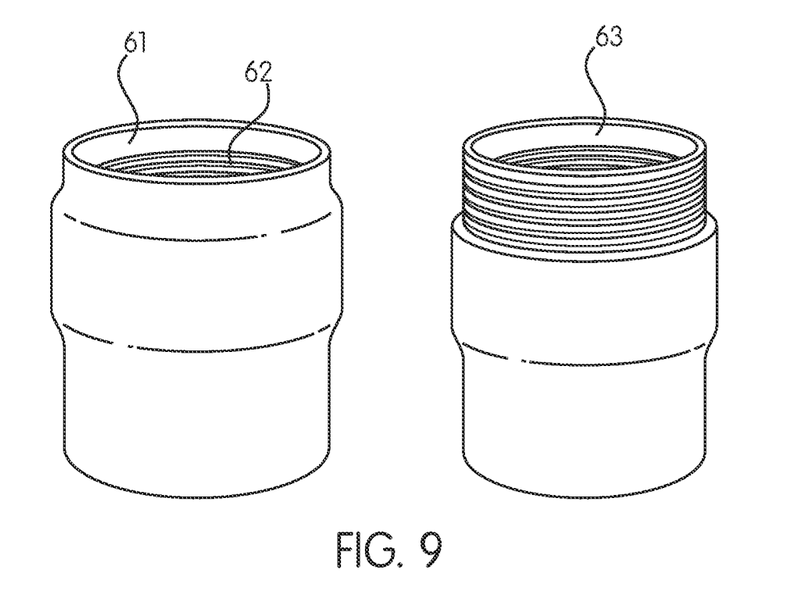
FIG. 9 is a perspective view of the disassembled components of the compression-type coupling of FIG. 7A after they have been coated.
Figure 10:
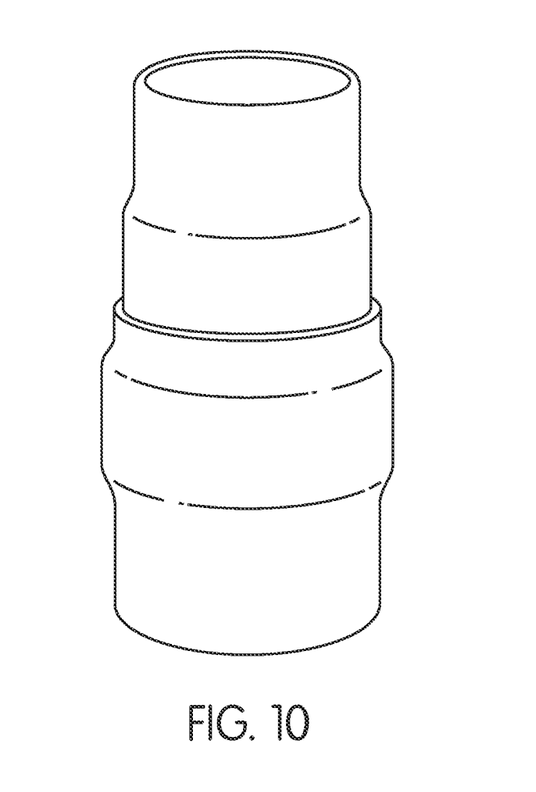
FIG. 10 is a perspective view of the components of the compression-type coupling of FIG. 7A after they have been coated and assembled.

With reference to FIG. 13, the coated coupling of FIGS. 9 and 10 can be installed onto a coated conduit 68 using the following procedure. First, the polymeric material is removed from the unthreaded end of the coated conduit 68 as described hereinabove. Then, the coated top piece 61 with the compression ring 62 provided therein is connected to the unthread end of the conduit 68 where the polymeric material has been removed. Thereafter, the coated bottom piece 63 is connected to the coated top piece 61 to install the coated coupling.

Figure 14:
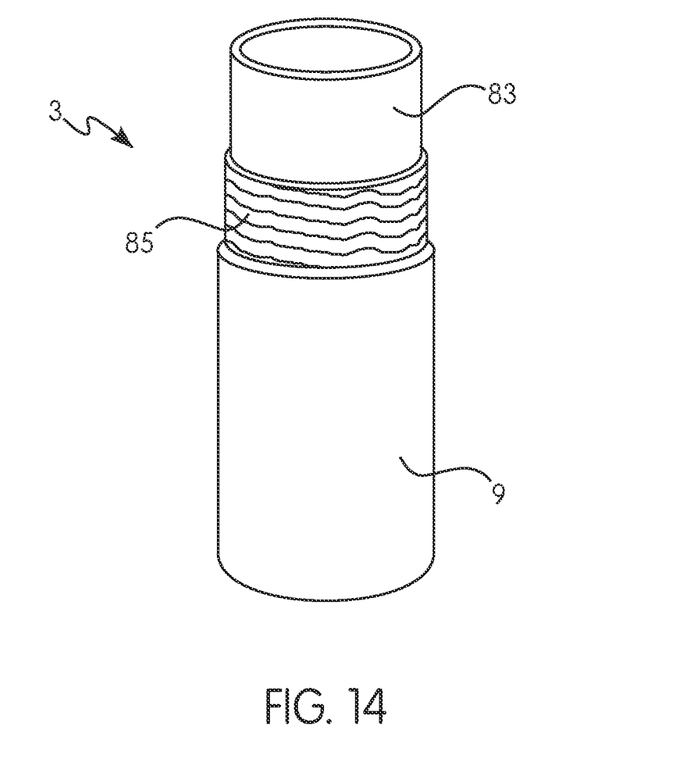
FIG. 14 is a perspective view of a conduit having two stages of coating removal.

With reference to FIG. 14, in certain instances, it may be desirable to remove all of the PVC coating from a first end of the coated conduit using tool 1 or 40 to form an uncoated section 83 and then adjusting the diameter of the teeth elements 21 as described hereinabove to remove a portion of the PVC coating for a length of the conduit extending from the portion that has been completely stripped to form a partially coated section 85. The uncoated section 83 allows for metal to metal contact between the metallic conduit 5 and the compression-type coupling. This maintains the electrical continuity of the system at the connection which acts as a medium for ground.

The partially coated section 85 allows for the coated compression-type coupling to be more easily installed. Section 85 allows from the inner diameter of the compression-type coupling to fit over the outer diameter of the conduit during the installation process but maintains corrosion protection of the joint after the compression-type coupling has been installed.

While specific embodiments of the device of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof.

The invention claimed is:

1. A method of connecting a coated conduit to a compression-type coupling comprising:
   providing the coated conduit comprising a metallic conduit having an outer diameter and a polymeric material applied over the outer diameter of the metallic conduit;
   removing the polymeric material from the outer diameter of an end of the metallic conduit; and
   connecting the compression-type coupling to the end of the metallic conduit where the polymeric material has been removed,
   wherein the polymeric material is removed from the outer diameter using a tool comprising:
   a guide member having an outer diameter sized to fit within an internal diameter of the metallic conduit; and
   a cylindrical cutting member comprising: a substantially closed first end rotatably connected to an arbor; a substantially open second end comprising cutting elements; and an inner diameter that is substantially equal to the outer diameter of the metallic conduit.

2. The method of claim 1, wherein the polymeric material is only removed from the end of the coated conduit while a remaining length of the coated conduit comprises the polymeric material applied over the outer diameter of the metallic conduit.

3. The method of claim 1, wherein the polymeric material is completely removed from the end of the coated conduit to form a stripped portion and a portion of the polymeric material is removed for a length of the coated conduit extending from the stripped portion.

4. The method of claim 1, wherein the polymeric material is removed from the outer diameter of the end of the metallic conduit by the cutting elements by rotating the cylindrical cutting member.

5. The method of claim 1, wherein the arbor is operatively connected to a drill to rotate the cylindrical cutting member.

6. The method of claim 1, wherein the guide member is positioned within the coated conduit coaxially with the cylindrical cutting member such that the cylindrical cutting member surrounds the guide member.

7. The method of claim 1, wherein the guide member is operatively connected to the first end of the cylindrical cutting member such that the guide member rotates with the cylindrical cutting member.

8. The method of claim 1, wherein the guide member is inserted into the coated conduit and includes a guide hole on an upper surface thereof to guide the cylindrical cutting member.

9. The method of claim 1, further comprising: coating the compression-type coupling with a polymeric material prior to connecting the compression-type coupling to the end of the metallic conduit.

10. A method of connecting a coated conduit to a compression-type coupling comprising:
    providing the coated conduit comprising a metallic conduit having an outer diameter and a polymeric material applied over the outer diameter of the metallic conduit;
    coating the compression-type coupling with a polymeric material;

removing the polymeric material from the outer diameter of an end of the metallic conduit such that the polymeric material is completely removed from the end of the coated conduit to form a stripped portion and a portion of the polymeric material is removed for a length of the coated conduit extending from the stripped portion; and connecting the compression-type coupling to the end of the metallic conduit where the polymeric material has been removed.

11. The method of claim 10, wherein the polymeric material is removed from the outer diameter using a tool comprising:

a guide member having an outer diameter sized to fit within an internal diameter of the metallic conduit; and a cylindrical cutting member comprising: a substantially closed first end rotatably connected to an arbor; a substantially open second end comprising a plurality of teeth elements; and an inner diameter that is substantially equal to the outer diameter of the metallic conduit.

12. The method of claim 11, wherein the polymeric material is removed from the outer diameter of the end of the metallic conduit by the plurality of teeth elements by rotating the cylindrical cutting member.

13. The method of claim 11, wherein the arbor is operatively connected to a drill to rotate the cylindrical cutting member.

14. The method of claim 11, wherein the guide member is positioned within the coated conduit coaxially with the cylindrical cutting member such that the cylindrical cutting member surrounds the guide member.

15. The method of claim 11, wherein the guide member is operatively connected to the first end of the cylindrical cutting member such that the guide member rotates with the cylindrical cutting member.

16. The method of claim 11, wherein the guide member is inserted into the coated conduit and includes a guide hole on an upper surface thereof to guide the cylindrical cutting member.

\* \* \* \* \*